United States Patent [19]

Zahir et al.

[11] 4,371,719
[45] Feb. 1, 1983

[54] CURABLE MIXTURES BASED ON MALEIMIDES AND PROPENYL-SUBSTITUTED PHENOLS, AND THE USE THEREOF

[75] Inventors: Abdul-Cader Zahir, Oberwil; Siegfried Wyler, Dornach, both of Switzerland

[73] Assignee: Ciba-Geigy Corporation, Ardsley, N.Y.

[21] Appl. No.: 237,237

[22] Filed: Feb. 23, 1981

Related U.S. Application Data

[62] Division of Ser. No. 104,593, Dec. 17, 1979, Pat. No. 4,288,583.

[30] Foreign Application Priority Data

Dec. 29, 1978 [CH] Switzerland ............. 13279/78

[51] Int. Cl.³ ............................................. C07C 39/16
[52] U.S. Cl. ............................... 568/723; 568/729
[58] Field of Search ............... 568/723, 48, 729, 46, 568/49, 638, 720, 34

[56] References Cited

U.S. PATENT DOCUMENTS

| | | | |
|---|---|---|---|
| 2,773,907 | 12/1956 | Sullivan | 568/72 |
| 2,955,038 | 10/1960 | Smith | 568/638 |
| 3,057,928 | 10/1962 | Koblitz et al. | 568/720 |
| 3,234,288 | 2/1966 | Moss et al. | 568/638 |
| 3,288,864 | 11/1966 | Farnham | 568/720 |
| 3,297,575 | 1/1967 | Worrel | 568/720 |
| 3,471,576 | 10/1969 | Klesper | 568/638 |
| 3,522,271 | 7/1970 | Kalil | 526/258 |
| 3,647,751 | 3/1972 | Darsow | 568/34 |
| 3,830,781 | 8/1974 | Leslie | 568/34 |
| 3,960,812 | 6/1976 | Renner et al. | 526/258 |
| 4,100,140 | 7/1978 | Zahir et al. | 526/258 |
| 4,115,287 | 9/1978 | Swinney et al. | 568/48 |
| 4,226,800 | 10/1980 | Picklesimer | 568/720 |
| 4,242,527 | 12/1980 | Mark et al. | 568/48 |
| 4,288,583 | 9/1981 | Zahir et al. | 526/562 |

FOREIGN PATENT DOCUMENTS

| | | | |
|---|---|---|---|
| 53-77028 | 7/1978 | Japan | 568/638 |
| 1172276 | 11/1969 | United Kingdom | 568/720 |

OTHER PUBLICATIONS

A. R. Bader, J. Am. Chem. Soc, 78, 1709, (1956).
Organic Reactions, vol. II, pp. 18-19, (1944).

*Primary Examiner*—Werren B. Lone
*Attorney, Agent, or Firm*—Luther A. R. Hall

[57] ABSTRACT

Curable mixtures of
(a) maleimides of the general formula I

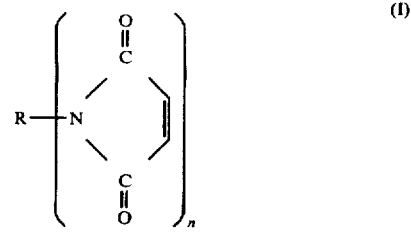

wherein R is an n-valent aliphatic or aromatic radical, and n is the number 1, 2 or 3; and (b) mono- or polyvalent phenols which contain in the molecule at least one 1-propenyl group in the ortho- or para-position with respect to the hydroxyl group, or isomeric mixtures of mono- or polyvalent phenols which are propenyl-substituted in the ortho- or para-position and mono- or polyvalent phenols which are allyl-substituted in the ortho- or para-position, the proportion of propenyl groups in the isomeric mixture having to be at least 5 equivalent-%, relative to the sum of the equivalents of propenyl and allyl groups.

The novel mixtures cure at elevated temperatures relatively rapidly, and produce molded materials having valuable mechanical properties.

2 Claims, No Drawings

CURABLE MIXTURES BASED ON MALEIMIDES AND PROPENYL-SUBSTITUTED PHENOLS, AND THE USE THEREOF

This is a divisional of application Ser. No. 104,593, filed on Dec. 17, 1979, now U.S. Pat. No. 4,288,583, issued on Sep. 8, 1981.

The present invention relates to novel curable mixtures of maleimides and propenyl-substituted phenols, and also to a process for producing crosslinked copolymers from these mixtures.

There are disclosed in the French Pat. No. 2,316,267 thermosetting mixtures of maleimides and allyl-substituted phenols, which mixtures can be processed into moulded materials and bonds having valuable mechanical properties, especially high stability to heat. These curable mixtures have however the disadvantage that very long curing times are required for curing them even at relatively high temperatures. There is also the suggestion in the stated French patent specification that polymerisation catalysts be optionally added to the curable mixtures; however, an addition of polymerisation catalysts in the case of copolymers is not completely without problems with regard to the ultimate properties of the polymers. The result for example of alkaline polymerisation catalysts can be that the maleimide groups mainly homopolymerise and that copolymerisation is reduced, the consequence being that materials having undesirable properties are obtained.

It has now been found that the disadvantages described above can be avoided or greatly reduced by using, in place of allyl-substituted phenols, those phenols which contain at least one propenyl group in the molecule. Mixtures of maleimides and propenyl-substituted phenols have the advantage that they cure more rapidly at elevated temperatures, and that furthermore they yield moulding materials having good mechanical properties.

The present invention relates therefore to novel curable mixtures which contain (a) maleimides of the general formula I

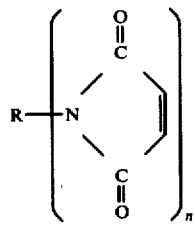

(I)

wherein R is an n-valent aliphatic or aromatic radical, and n is the number 1, 2 or 3; and (b) mono- or polyvalent phenols which contain in the molecule at least one 1-propenyl group in the ortho- or para-position with respect to the hydroxyl group, or isomeric mixtures of mono- or polyvalent phenols which are propenyl-substituted in the ortho- or para-position and mono- or polyvalent phenols which are allyl-substituted in the ortho- or para-position, the proportion of propenyl groups in the isomeric mixture having to be at least 5 equivalent-%, relative to the sum of the equivalents of propenyl and allyl groups.

Preferred curable mixtures are those which contain maleimides of the formula I wherein R is a mono- or bivalent aromatic radical, and n is the number 1 or 2.

In a particular embodiment, the curable mixtures contain maleimides of the given formula wherein R is a phenyl group which is unsubstituted or substituted by methyl or by halogen atoms, or wherein R is in particular a phenylene group which is unsubstituted or substituted by methyl, or is a radical of the formula

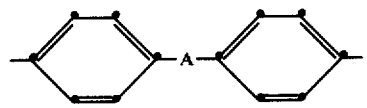

wherein A is isopropylene, methylene, sulfonyl, —O— or —S—.

The radical R in the maleimides of the given formula can be a straight-chain or branched-chain alkyl or alkylene group having less than 20 carbon atoms; a phenyl or phenylene group; or a radical of the formula

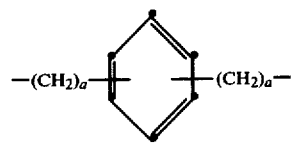

in which a is an integer of 1 to 3. The radical R can also embrace several phenylene groups which are bound together directly or by a simple valence bond, or by an atom or an inert group, for example oxygen or sulfur atoms, alkylene groups having 1 to 3 carbon atoms, or by way of the following groups: —CO—, —SO$_2$—, —NR$_1$— (R$_1$=alkyl), —N=N—, —CONH—, —COO—, —CONH—A—NHCO—, O=P(O-)$_3$ or S=P(O-)$_3$.

The phenyl or phenylene groups can furthermore be substituted by methyl groups or by halogen atoms, such as fluorine, chlorine or bromine.

The maleimides of the given formula constitute a known class of compounds, and can be produced, with application of the methods described in the U.S. Pat. No. 3,522,271 and in the G.B. Pat. No. 1,137,592, by reacting the appropriate amines or polyamines with the maleic anhydride in a polar solvent and in the presence of a catalyst. Phosphorous-containing maleimides and the production thereof are moreover described in the Belgian Pat. No. 806,071.

The following may be mentioned as special examples of maleimides which can be contained in the mixtures according to the invention:
N,N'-ethylene-bis-maleimide,
N,N'-hexamethylene-bis-maleimide,
N,N'-m-phenylene-bis-maleimide,
N,N'-p-phenylene-bis-maleimide,
N,N'-4,4'-diphenylmethane-bis-maleimide,
N,N'-4,4'-3,3'-dichlorodiphenylmethane-bis-maleimide,
N,N'-4,4'-diphenyl ether-bis-maleimide,
N,N'-4,4'-diphenylsulfone-bis-maleimide,
N,N'-m-xylylene-bis-maleimide,
N,N'-p-xylylene-bis-maleimide,
N,N'-4,4'-2,2-diphenylpropane-bis-maleimide,
the N,N'-bis-maleimide of 4,4'-diamino-triphenyl phosphate, the N,N'-bis-maleimide of 4,4'-diamino-triphenyl phosphite, the N,N'-bis-maleimide of 4,4'-diamino-triphenyl thiophosphate, the N,N',N''-tris-maleimide of tris-(4-aminophenyl)-phosphate, the N,N',N''-tris-maleimide of tris-(4-aminophenyl)-phosphite, and the N,N',N''-tris-maleimide of tris-(4-aminophenyl)-thiophosphate.

It is also possible to use mixtures of two or more of these maleimides or polymaleimides.

Well suited as mixture component (b) are the propenyl-substituted phenols of the formula II

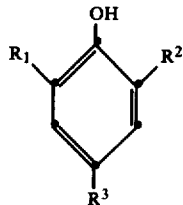
(II)

wherein $R^1$, $R^2$ and $R^3$ are each a hydrogen atom, or an allyl or propenyl group, with at least one of the substituents $R^1$ to $R^3$ being the propenyl group; of the formula III

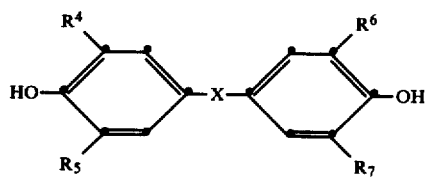
(III)

wherein $R^4$, $R^5$, $R^6$ and $R^7$ are each a hydrogen atom, or an allyl or propenyl group, with at least one of the substituents $R^4$ to $R^7$ being the propenyl group, and X is isopropylene, methylene, sulfonyl, —O— or —S—; or of the formula IV

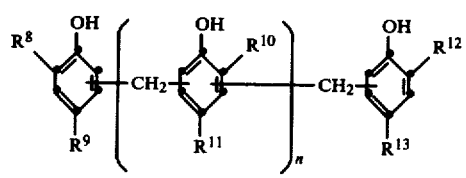
(IV)

wherein $R^8$, $R^9$, $R^{10}$, $R^{11}$, $R^{12}$ and $R^{13}$ are each a hydrogen atom, alkyl having having 1 to 4 C atoms, allyl or propenyl, with at least one of the substituents $R^8$ to $R^{13}$ being the propenyl group, and n denotes a value from 0 to 10 inclusive.

There are preferably used as mixture component (b) the propenyl-substituted phenols of the formula III, especially those where in the formula III $R_4$ and $R_6$ are each a propenyl group, $R^5$ and $R^7$ are each a hydrogen atom, and X is isopropylene, methylene or —O—.

Also the isomeric mixtures of propenyl- and allyl-substituted mono- and polyvalent phenols are suitable as mixture component (b), the proportion of propenyl groups in the isomeric mixture being preferably at least 10 equivalent-%, particularly at least 20 equivalent-%, relative to the sum of the equivalents of propenyl and allyl groups.

Isomeric mixtures preferably used are mixtures of propenyl- and allyl-substituted phenols of the formula III, especially those which are obtained by partial isomerisation of ally-substituted phenols of the formula

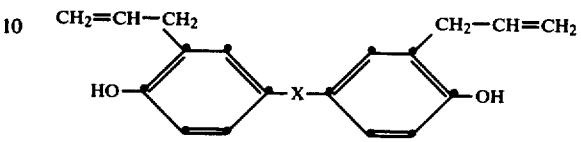

wherein X is isopropylene, methylene or —O—.

The propenyl-substituted phenols of the formula II are known and can be obtained, using the process described in the Journal of American Chemical Society (1956), pp. 1709 to 1713, by alkaline isomerisation of the corresponding allyl-substituted phenols, the process comprising for example heating 2,6-diallylphenol, in the presence of at least an equal amount of potassium hydroxide solution, at above 100° C. until all the allyl groups have been isomerised to propenyl groups and the corresponding 2,6-dipropenylphenol has been formed. With use of less than the equal amount of potassium hydroxide solution, with application of lower isomerisation temperatures or with interruption of the isomerisation reaction, isomerisation proceeds only partially, and hence the isomeric mixtures consisting of propenyl- and allyl-substituted phenols are obtained. It is naturally also possible to produce isomeric mixtures by mixing pure propenylphenols with allylphenols.

The propenyl-substituted phenols of the formulae III and IV have not hitherto been described in the literature, and can likewise be produced by the alkaline isomerisation process mentioned above.

The allyl-substituted phenols used as starting compounds in the isomerisation process are obtained, as is known, by etherification of the phenolic hydroxyl group with allyl chloride, and subsequent Claisen rearrangement. The corresponding polyallylphenols are obtained by repeating this conversion and rearrangement reaction.

The propenyl-substituted bivalent phenols of the formulae III and IV, which have hitherto not been described in the literature, are resinous compounds which, compared with the prior known 2,6-dipropenyl-phenol, can, in admixture with maleimides, be better processed as moulding materials and sinter powders. Furthermore, the novel compounds have the advantage that they do not have the unpleasant smell which renders working with the prior known 2,6-dipropenyl-phenol difficult.

The mixtures according to the invention contain the maleimides (a) and the propenyl-substituted phenols (b) in such a quantity ratio that to 1 equivalent of imide group, there are 0.05 to 10 mols, preferably 0.25 to 1.5 mols, of the propenyl-substituted phenols or of the isomeric mixture.

The curable mixtures according to the invention can also contain several different maleimides of the given formula, as well as maleimides having different valencies.

The curing of the mixtures according to the invention to obtain insoluble crosslinked copolymerisation products is performed by heating the mixtures, optionally containing inhibitors, at temperatures of 50° to 250° C, preferably at temperatures between 100° and 250° C., depending on whether the polymerisation reaction is carried out in the melt or in solvents, or in the presence of catalysts or inhibitors.

When curing is performed in the melt, temperatures of 100° to 250° C. are particularly suitable, curing advantageously being commenced at temperatures below 180° C. Even lower temperatures are however applicable in solution, for example 50° to 150° C.

The mixtures according to the invention are preferably cured in the melt, or partially in the melt and partially in the solid phase.

The following substances are listed as being examples of suitable solvents: acetone, methyl ethyl ketone, ethylene glycol monomethyl ether, ethylene glycol, chloroform, dioxane, tetrahydrofuran, dimethylformamide tetramethylurea and N-methylpyrrolidone.

Depending on the purpose of application or on the method of processing, there can be added to the mixtures according to the invention also inhibitors, such as hydroquinone, phenothiazine or indole. The concentration of inhibitors in the reaction mixture is customarily between 0.1 and 5 percent by weight, relative to the total amount of reacting components. It is also possible to firstly produce from the mixtures according to the invention a further pre-polymer by temporarily heating the homogeously mixed and optionally finely ground starting materials at 50°-150° C., so that a product is formed which is still thermoplastic and partially soluble. This pre-polymer has if necessary to be ground again into the form of a processible powder. Pre-polymerisation can also be performed by heating a solution or suspension of the starting materials. Suitable substances for this purpose are substances which do not react with the starting materials, and which sufficiently dissolve them if required. Liquids of this type are for example the organic solvents already mentioned in the foregoing.

It is also possible to produce the pre-polymer by a process in which firstly one of the two reactants is added in an amount much lower than the equivalent amount, and the mixture prepared in this manner is then heated at 50° to 150° C. to obtain a pre-polymer which is still fusible and sufficiently soluble. After subsequent addition of the lacking amount of the component initially added in an amount lower than the equivalent amount, the product can then be finally cured in the finishing operation.

The curable mixtures according to the invention are used in particular in the fields of electrical engineering and of laminating processes. They can be used in a formulation specially adapted to suit a specific purpose of application, in the unfilled or filled condition, optionally in the form of solutions or dispersions, as dip resins, casting resins, impregnating resins, bonding agents, laminating resins, moulding materials and foam resins.

Also forming subject matter of the invention is thus a process for producing crosslinked, insoluble and infusible copolymerisation products, which process comprises reacting, in the temperature range of 50° to 250° C., (a) maleimides of the general formula I

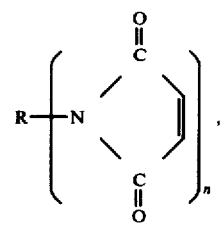

wherein R is an n-valent, aliphatic or aromatic, radical, and n is the number 1, 2 or 3, with (b) mono- or polyvalent phenols which contain in the molecule at least one 1-propenyl group in the ortho- or para-position with respect to the hydroxyl group, or with isomeric mixtures of mono- or polyvalent phenols which are propenyl-substituted in the ortho- or para-position and mono- or polyvalent phenols which are allyl-substituted in the ortho- or para-position, the proportion of propenyl groups in the isomeric mixture having to be at least 5 equivalent-%, relative to the sum of the equivalents of propenyl and allyl groups.

The crosslinked infusible copolymerisation products are produced according to the invention as a rule simultaneously with the shaping of them into moulded articles, sheet material, laminates, bonds, and so forth. In the process, there can be added to the curable compounds the additives customary in the technology of curable plastics, such as fillers, plasticisers, pigments, dyes, mould lubricants or flame-retarding substances. The fillers used can be for example: glass fibres, mica, quartze flour, kaolin, colloidal silicon dioxide or metal powders; and the internal mould lubricant can be, for example, calcium stearate. Shaping can be effected by the hot compression process by a brief rapid heating in a press at preferably 170°-250° C. under a pressure of 1-200 kp/cm². The moulded articles resulting already possess adequate mechanical strength, so that they can be completely cured, out of the press, in an oven at 200°-280° C.

If firstly a pre-polymer is produced from the curable mixtures, it can, after being ground to a fine powder, be applied as a coating using the whirl sinter process.

A solution or suspension of the pre-polymer in a suitable solvent can be used for producing laminates; this process comprises impregnating porous sheet material, such as fabrics, fibre mats or fibre fleeces, particularly glass fibre mats or glass fibre fabrics, with solutions or suspensions, and subsequently removing the solvent by a drying operation. Further curing is effected in a press preferably at 170°-250° C. and under 1-200 kp/cm² pressure. It is also possible to just pre-cure the laminates in the press, and to aftercure the resulting products in an oven at 200°-280° C. until optimum performance characteristics are obtained.

EXAMPLE A

Production of 2,2-bis-[3-(1-propenyl)-4-hydroxyphenyl]-propane

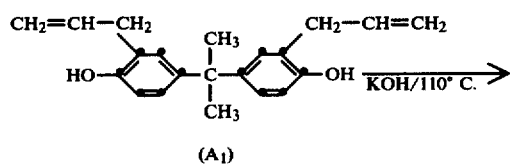

(A₁)

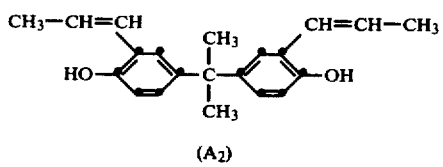

(A₂)

400 ml of methanol is slowly added with stirring to a mixture of 3 mols of 2,2-bis-(3-allyl-4-hydroxyphenyl)-propane (A₁) and potassium hydroxide pellets. The mixture is afterwards carefully heated to 110° C. with the distilling off of 116 ml of methanol. The reaction solution is subsequently held, with reflux cooling, for a further 6 hours at 110° C. The reaction solution is then cooled, neutralised with conc. HCl, and extracted with methylene chloride. The extract is dried, and completely evaporated to dryness to thus yield essentially pure 2,2-bis-[3-(1-propenyl)-4-hydroxyphenyl]-propane (A₂), which at room temperature is a very highly viscous yellow liquid. The structural formula A₂ is confirmed by microanalysis and H-NMR, MS and UV spectroscopy, as well as by means of gel-permeation chromatography.

EXAMPLE B

Production of isomeric mixtures by means of partial isomerisation of 2,2-bis-(3-allyl-4-hydroxyphenyl)-propane.

The method described in Example A is applied, except that 250 ml of methanol is added to the reaction mixture, and the isomerisation temperature is maintained constant at 100° C. Under these reaction conditions, the isomerisation reaction of all allyl groups into the propenyl groups proceeds sufficiently slowly to be able to interrupt the isomerisation reaction at any desired degree of isomerisation. The proportion of the isomeric propenyl compounds formed in the reaction mixture is determined by H-NMR spectroscopic measurements on specimens taken from the isomerisation mixture.

After 13 minutes, the proportion of formed isomeric propenyl groups is 15 equivalent-%, relative to the sum of the equivalent propenyl and ethyl groups.

After 18 minutes at 100° C., the proportion of isomeric propenyl groups is 21.7 equivalent-%, and after 55 minutes at 100° C., the proportion is isomeric propenyl groups in the isomeric mixture is 50.75 equivalent-%.

EXAMPLES 1 and 2

Production of glass fibre prepregs

Impregnating solutions for producing glass fibre prepregs are obtained by mixing N,N'-4,4'-diphenylmethane-bis-(maleimide) (designated as maleimide I in the following) with 2,2-bis-(3-allyl-4-hydroxyphenyl)-propane (comparison 1) or with partially isomerised 2,2-bis-(3-allyl-4-hydroxyphenyl)-propane (Examples 1 and 2), in the quantity ratios given in Table I, and heating the mixture, with stirring, at 120° C. until the melt is a clear solution. The melt is then allowed to react at 120° C. for the length of time given in Table I, and is diluted with the solvent mixture shown in Table I to give a solution containing 70 percent by weight of solid particles. The solution is subsequently rapidly cooled to room temperature.

TABLE I

|  | Comparison 1 | Example 1 | Example 2 |
|---|---|---|---|
| bismaleimide I (parts by weight) | 100 | 100 | 100 |
| 2,2-bis-(3-allyl-4-hydroxyphenyl)-propane (parts by weight) | 100 | — | — |
| partially isomerised 2,2-bis-(3-allyl-4-hydroxyphenyl)-propane (parts by weight) | — | 100 | 100 |
| content of isomeric propenyl groups (equivalent-%) | 0 | 21.7 | 50.75 |
| ethylene glycol monoethyl ether (wt. %) | 32 | 32 | 32 |
| furfuryl alcohol (wt. %) | 10 | 10 | 10 |
| reaction time at 120° C. (minutes) | 190 | 15 | 0.5 |
| viscosity at 25° C. (in Pa · s) | 1232 | 682 | 1098 |
| gelling time at 190° C. (seconds) at 150° C. | 170 | 82 | 82 |
| at 150° C. | 490 | 290 | 140 |
| at 120° C. | 1600 | 930 | 350 |
| F$_t$/F$_{180}$(%) after 30 min. | 21 | 34 | 53.5 |
| 60 min. | 46.7 | 51.9 | 70.4 |
| 120 min. | 76.2 | 70.4 | 91.0 |
| 180 min. | 100 | 100 | 100 |
| (F$_t$ = relative torsion modulus at time t F$_{180}$ = relative torsion modulus after 180 min. and curing at 180° C.) interlaminar shearing strength ASTM* D 2344 (N/mm²) after curing 1 hour/170° C. | 6.21 | 9.0 | 13.1 |
| 3 hours/170° C. and 3 hours/240° C. | 24.77 | 29.6 | 33.9 |

*ASTM = American Society for Testing and Materials

EXAMPLES 3 to 7 and Comparison 2

Maleimide I, 2,2-bis-(3-allyl-4-hydroxyphenyl)-propane and 2,2-bis-[3-(1-propenyl)-4-hydroxyphenyl]-propane are well mixed together in the amounts given in Table 2. The gelling time at 150° C. is determined with a portion of the respective mixture. With the remaining portion of the respective mixtures, aluminium pegs are bonded according to specification for measurements with the "Twist-o-Meter" (Epprecht, Instruments + Controls, Bassersdorf, Switzerland). The mixtures are heated at 120° C. with stirring until a viscous solution is obtained. There are subsequently produced with the solution cooled to room temperature 5 bonds, which are then cured for 3 hours at 145° C., for 3 hours at 200° C. and for 6 hours at 250° C. The results of the gelling time measurements and of the torsional shearing strength measurements are given in Table 2.

TABLE 2

|  | Comparison 2 | Example 3 | Example 4 | Example 5 | Example 6 | Example 7 |
|---|---|---|---|---|---|---|
| maleimide I (parts by weight) | 100 | 100 | 100 | 100 | 100 | 100 |
| 2,2-bis-(3-allyl-4-hydroxyphenyl-propane) (parts by weight) | 100 | 98 | 80 | 70 | 60 | 50 |
| 2,2-bis-[3-(1-propenyl)-4-hydroxy- | — | 10 | 20 | 30 | 40 | 50 |

TABLE 2-continued

|  | Comparison 2 | Example 3 | Example 4 | Example 5 | Example 6 | Example 7 |
|---|---|---|---|---|---|---|
| phenyl]-propane (parts by weight) |  |  |  |  |  |  |
| gelling time at 150° C. (seconds) | 300 | 170 | 122 | 85.5 | 76.5 | 60 |
| torsional shearing strength (N/mm$^2$) (Twist-o-Meter) | 73.6 | 67.4 | 64.8 | 66.6 | 62.6 | 60.8 |

EXAMPLE 8

1.0 mol of maleimide I and 1.15 mols of partially isomerised 2,2-bis-(3-allyl-4-hydroxyphenyl)-propane having a content of isomeric propenyl groups of 15 equivalent-% are melted at 120° C. There is simultaneously added to the melt 10 percent by weight of furfuryl alcohol. The solution is pre-reacted for 30 minutes, whereupon it is cooled to 60° C., and diluted by the addition of ethylene glycol monoethyl ether to give a 60% solution. The impregnating viscosity is adjusted to the desired value of 200 cP/25° C. by the addition of a small amount of ethylene glycol monoethyl ether.

This solution is then used for impregnating a glass fabric which has a weight per square meter of 200 g and a plain weave, and which contains as adhesion promoter a chromium-III methacrylate complex of the formula

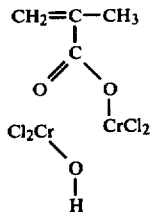

The glass fabric is impregnated at 25° C. in the immersion process, and afterwards dried for 8 minutes at 150° C. in an air-circulation oven. Three layers of the impregnated fabric are pressed for 1 hour at 170° C. between two 35-micron thick copper sheets which have been pretreated by means of surface electrolytic brass coating. The press is firstly held for 2 minutes at a slight contact pressure, the pressure subsequently being raised to 30 kp/cm$^2$. The pre-reaction stage in the drying oven can be avoided by a correspondingly longer contact time in the press. After one hour, the specimen is removed from the press, and is aftercured for a further 2 hours at 170° C. and for 3 hours at 240° C. in an oven. A tough, mechanically high-grade, heat-resistant laminated material, the properties of which are given in Table 3, is obtained.

EXAMPLE 9

The procedure is carried out as described in Example 8 but with the use of a partially isomerised 2,2-bis-(3-allyl-4-hydroxyphenyl)-propane having a content of isomeric propenyl groups of 21.7 equivalents-%, and the solution is allowed to pre-react for 15 minutes at 120° C.

EXAMPLE 10

The procedure is carried out as described in Example 8 but using in this case a partially isomerised 2,2-bis-(3-allyl-4-hydroxyphenyl)-propane having a content of isomeric propenyl groups of 50.75 equivalent-%, and the solution is allowed to pre-react for 5 minutes at 120° C.

EXAMPLE 11

1.0 mol of maleimide I is dissolved at 120° C. with the addition of 20 percent by weight of furfuryl alcohol, and the solution is heated for a further 5 minutes at this temperature. Immediately afterwards there are added to the solution 1.15 mols of 2,2-bis-[3-(1-propenyl)-4-hydroxy-phenyl]-propane. Without further pre-reaction, the solution is cooled to 60° C., and is diluted to a 60% solution by the addition of ethylene glycol monoethyl ether.

COMPARISON 3

The procedure is carried out as described in Example 8 except that pure 2,2-bis-(3-allyl-4-hydroxyphenyl)-propane is used, and the solution is pre-reacted for 190 minutes at 120° C.

TABLE 3

|  | Ex. 8 | Ex. 9 | Ex. 10 | Ex. 11 | Comparison 3 |
|---|---|---|---|---|---|
| maleimide I (mol) | 1 | 1 | 1 | 1 | 1 |
| 2,2-bis-(3-allyl-4-hydroxyphenyl)-propane (mol) | — | — | — | — | 1.15 |
| isomerised 2,2-bis-(3-allyl-4-hydroxyphenyl)-propane (mol) | 1.15 | 1.15 | 1.15 | 1.15 | — |
| content of isomeric propenyl groups (equivalent-%) | 15 | 21.7 | 50.75 | 100 | — |
| furfuryl alcohol (weight %) | 10 | 10 | 10 | 10 | 10 |
| ethylene glycol monoethyl ether (weight %) | 32 | 32 | 32 | 32 | 32 |
| duration of the pre-reaction at 120° C. (min.) | 30 | 15 | 5 | — | 190 |
| viscosity at 25° C. (mPa · s) | 777 | 682 | 1098 | 3770 | 1232 |
| gelling time at 190° C. (seconds) | 84 | 82 | 82 | 65 | 170 |
| 150° C. (seconds) | 315 | 290 | 140 | 127 | 490 |
| 120° C. (seconds) | 1160 | 930 | 350 | 321 | 1600 |
| interlaminar shearing strength (ASTM D2344) after curing: 1 hour at 170° C. | 7.2 | 9.0 | 13.1 | 17.6 | 6.2 |
| 3 hours at 170° C. and 3 hours at 240° C. | 25.5 | 29.6 | 33.9 | 26.3 | 24.8 |

What is claimed is:
1. A polyvalent phenol of the formula III

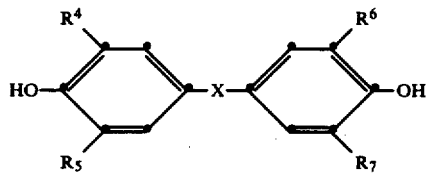

(III)

where $R^4$, $R^5$, $R^6$ and $R^7$ are each a hydrogen atom, or an allyl or propenyl group, with at least one of the substituents $R^4$ to $R^7$ being the propenyl group, and X is isopropylidene or methylene or of the formula IV

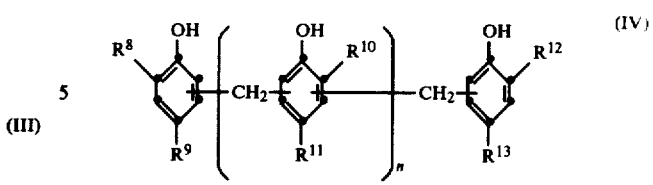

(IV)

wherein $R^8$, $R^9$, $R^{10}$, $R^{11}$, $R^{12}$, $R^{13}$ are each a hydrogen atom, alkyl having 1 to 4 C atoms, allyl or propenyl, with at least one of the substituents $R^8$ to $R^{13}$ being the propenyl group, and n denotes a value from 0 to 10 inclusive, which contains in the molecule at least one 1-propenyl group in the ortho- or para-position with respect to the hydroxyl group, or an isomeric mixture of said polyvalent phenols which are propenyl-substituted in the ortho- or para-position and polyvalent phenols which are allyl-substituted in the ortho- or para-position, the proportion of propenyl groups in the isomeric mixture having to be at least 5 equivalent-%, relative to the sum of the equivalents of propenyl and allyl groups.

2. The compound which is 2,2-bis-[3-(1-propenyl)-4-hydroxyphenyl]propane.

* * * * *